(12) United States Patent
Ishizuka et al.

(10) Patent No.: US 10,011,227 B2
(45) Date of Patent: Jul. 3, 2018

(54) VEHICULAR VIEWING DEVICE

(71) Applicant: KABUSHIKI KAISHA TOKAI-RIKA-DENKI-SEISAKUSHO, Aichi-ken (JP)

(72) Inventors: Hiroki Ishizuka, Aichi-ken (JP); Tomonori Ichikawa, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 192 days.

(21) Appl. No.: 15/091,698

(22) Filed: Apr. 6, 2016

(65) Prior Publication Data

US 2016/0297363 A1   Oct. 13, 2016

(30) Foreign Application Priority Data

Apr. 9, 2015   (JP) ................. 2015-080073

(51) Int. Cl.
| | |
|---|---|
| B60R 1/00 | (2006.01) |
| G06K 9/00 | (2006.01) |
| G06T 11/60 | (2006.01) |
| B60K 35/00 | (2006.01) |
| H04N 7/18 | (2006.01) |

(52) U.S. Cl.
CPC ............ B60R 1/00 (2013.01); B60K 35/00 (2013.01); G06K 9/00671 (2013.01); G06K 9/00805 (2013.01); G06T 11/60 (2013.01); H04N 7/181 (2013.01); *B60K 2350/352* (2013.01); *B60R 2300/105* (2013.01); *B60R 2300/301* (2013.01); *B60R 2300/8093* (2013.01)

(58) Field of Classification Search
None
See application file for complete search history.

(56) References Cited

U.S. PATENT DOCUMENTS

| | | | | |
|---|---|---|---|---|
| 2004/0016870 A1* | 1/2004 | Pawlicki | ........... | B60K 31/0008 250/208.1 |
| 2005/0232469 A1* | 10/2005 | Schofield | ........... | G06K 9/00818 382/104 |
| 2007/0297075 A1* | 12/2007 | Schofield | ........... | B60R 1/04 359/872 |

(Continued)

FOREIGN PATENT DOCUMENTS

| | | |
|---|---|---|
| JP | 2004-306779 A | 11/2004 |
| WO | 2014204794 A1 | 12/2014 |

OTHER PUBLICATIONS

Marcus Tönis et al: "Survey and Classification of Head-Up Display Presentation Prindiples", Aug. 9, 2014 (Aug. 9, 2014), pp. 1-10, XP055297293.

(Continued)

*Primary Examiner* — Reza Aghevli
(74) *Attorney, Agent, or Firm* — Roberts Mlotkowski Safran Cole & Calderon P.C.

(57) ABSTRACT

A vehicular viewing device including a display section that displays an imaging result of a rear imaging section imaging behind a vehicle, and a controller that, when an warning target has been detected in the imaging result, controls the display section such that a predetermined warning image is displayed in a region outside a predetermined field of view required range in a captured image expressed by the imaging result.

8 Claims, 9 Drawing Sheets

(56) References Cited

U.S. PATENT DOCUMENTS

| | | | |
|---|---|---|---|
| 2009/0040306 A1* | 2/2009 | Foote | B60R 1/082 |
| | | | 348/148 |
| 2011/0115615 A1* | 5/2011 | Luo | B60R 1/00 |
| | | | 340/436 |
| 2012/0236388 A1* | 9/2012 | De Wind | B60R 1/04 |
| | | | 359/267 |
| 2013/0201335 A1 | 8/2013 | Heinemann | |
| 2014/0092481 A1* | 4/2014 | Hudson | G02B 5/02 |
| | | | 359/630 |
| 2014/0232872 A1* | 8/2014 | Kussel | B60R 1/00 |
| | | | 348/148 |
| 2014/0313335 A1* | 10/2014 | Koravadi | H04N 7/181 |
| | | | 348/148 |
| 2014/0313563 A1* | 10/2014 | Uken | B60R 1/088 |
| | | | 359/267 |
| 2014/0320656 A1* | 10/2014 | Foley | B60R 1/002 |
| | | | 348/148 |
| 2014/0340510 A1 | 11/2014 | Ihlenburg et al. | |
| 2014/0376119 A1* | 12/2014 | Sobecki | B60R 1/074 |
| | | | 359/841 |
| 2016/0137126 A1* | 5/2016 | Fursich | B60R 1/00 |
| | | | 348/38 |

OTHER PUBLICATIONS

DroidTweak: "iOnRoad Augmented Driving Pro", Dec. 18, 2012 (Dec. 18, 2012), pp. 1, XP054976734.

imaGinyze: "Augmented Driving 3-App",Youtube, Mar. 5, 2012 (Mar. 5, 2012), pp. 1, XP054976736.

Partial European Search Report for corresponding European Patent Application No. 16164034.7 dated Sep. 6, 2016.

\* cited by examiner

VEHICULAR VIEWING DEVICE

CROSS-REFERENCE TO RELATED APPLICATION

This application is based on and claims priority under 35 USC 119 from Japanese Patent Application No. 2015-080073 filed on Apr. 9, 2015, the disclosure of which is incorporated by reference herein.

BACKGROUND

Technical Field

The present invention relates to a vehicular viewing device for viewing vehicle surroundings by imaging the vehicle surroundings and displaying the captured images.

Related Art

Japanese Patent Application Laid-Open (JP-A) No. 2004-306779, for example, proposes technology for a vehicular viewing device that enables viewing of vehicle surroundings.

JP-A No. 2004-306779 describes the inclusion of a display controller that determines, according to the position of following vehicles measured by a rear monitoring radar, a region of a back mirror used by a driver to check for following vehicles, and that controls so as to display information regarding following vehicles using a projector, at a position that does not impede the rear checking action of the driver while changing the position.

However, in JP-A No. 2004-306779, since the information regarding following vehicles is projected in the mirror using the projector, it is possible that the information cannot be displayed in the intended position, depending on the adjustment position of the mirror.

In JP-A No. 2004-306779, information or a warning regarding a following vehicle is displayed in a position that is not superimposed on the following vehicle that is the checking target, as the position that does not impede the rear checking action of the driver. However, a field of view required range is determined by regulations and the like, and the information or warning may be superimposed in the field of view required range even when it is not in a position superimposed on the check target. There is accordingly room for improvement since the field of view required range sometimes cannot be viewed.

SUMMARY

In consideration of the above circumstances, an object of the present invention is to display a warning without impeding a predetermined field of view required range.

In order to achieve the above object, a first aspect of the present invention provides a vehicular viewing device including a display section that displays an imaging result of a rear imaging section imaging behind a vehicle, and a controller that, when an warning target has been detected in the imaging result, controls the display section such that a predetermined warning image is displayed in a region outside a predetermined field of view required range in a captured image expressed by the imaging result.

In the first aspect of the present invention, the imaging result of a rear imaging section that images behind the vehicle is displayed in the display section. This enables behind the vehicle to be viewed by checking the display section.

When a warning target has been detected in the imaging result, the controller controls the display section such that the predetermined warning image is displayed in the region outside the predetermined field of view required range in the captured image expressed by the imaging result. When an approaching vehicle, an obstacle, or the like has been detected as the warning target in the imaging result, for example, the controller is able to warn the occupant by displaying the warning image. The warning image is displayed in the region outside the field of view required range when being displayed, thereby enabling the warning to be displayed without impeding the field of view required range.

Note that the controller may control the display section such that the warning image is displayed in a region further toward an upper side than a horizon line or a vanishing point in the captured image as the region outside the field of view required range. For displaying the warning image in a region at the upper side of the horizon line, the horizon line may be found from an attachment position of the rear imaging section, and for displaying the warning image in a region at the upper side of the vanishing point, the vanishing point may be found from the captured image. By displaying the warning image in the region further toward the upper side than either the horizon line or the vanishing point in this manner, the region outside the field of view required range can be easily found without determining the different field of view required ranges according to the respective regulations of each country in the image.

The controller may further control the display section such that the size of the warning image is changed and displayed according to at least one of a size of the warning target in the captured image, or a distance to the warning target.

Note that the configuration may further include a rear imaging section that images behind the vehicle. In such cases, behind the vehicle imaged by the rear imaging section is not limited to behind, and may include the rear side of the vehicle.

The controller may extract a brightness of the specific region from an imaging result of a surroundings imaging section that images vehicle surroundings including at least a specific region on an extension line between an occupant and the display section, and further controls the display section so as to become a predetermined luminance according to the extracted brightness. The luminance is thereby adjusted according to the brightness ahead of the line of vision of the occupant when the occupant checks the display section, thereby enabling display to be performed at a suitable luminance corresponding to the brightness of the surroundings of the display section. In such cases, configuration may further include a surroundings imaging section that images vehicle surroundings including at least a specific region on an extension line between an occupant and the display section.

Note that the present invention may be a vehicular viewing device including a display section that displays an imaging result of a rear imaging section imaging behind a vehicle, and a controller that extracts a brightness of a specific region from an imaging result of a surroundings imaging section that images vehicle surroundings including at least the specific region on an extension line between an occupant and the display section, and controls the display section so as to become a predetermined luminance according to the extracted brightness.

The present invention as explained above has an advantageous effect of enabling a warning to be displayed without impeding the predetermined field of view required range.

BRIEF DESCRIPTION OF THE DRAWINGS

Exemplary embodiments of the present invention will be described in detail based on the following figures, wherein.

DETAILED DESCRIPTION

Detailed explanation follows regarding examples of exemplary embodiments of the present invention, with reference to the drawings.

First Exemplary Embodiment

Figure 1:
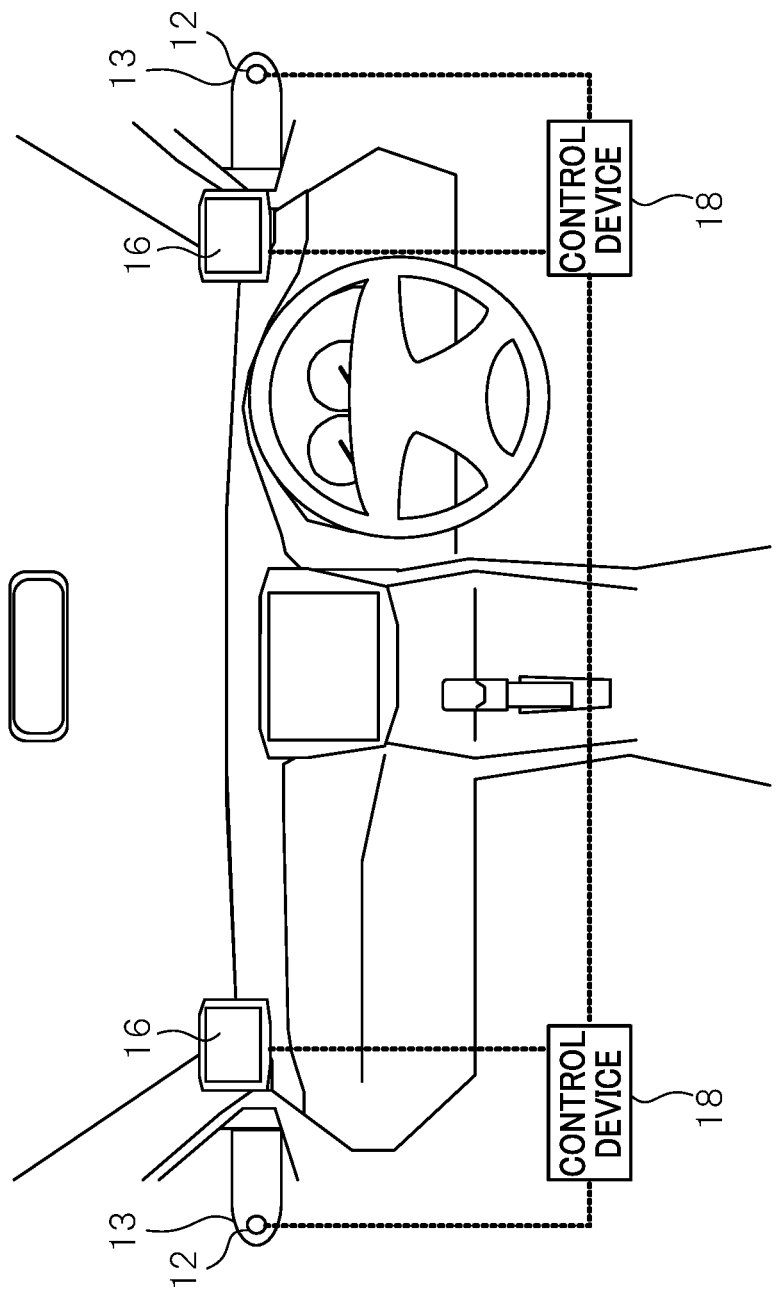
FIG. 1 is a diagram illustrating a schematic configuration of a vehicular viewing device according to a first exemplary embodiment.

FIG. 1 is a drawing illustrating a schematic configuration of a vehicular viewing device according to a first exemplary embodiment. As illustrated in FIG. 1, a vehicular viewing device 10 is provided with rear side cameras 12 serving as rear imaging sections, monitors 16 serving as display sections, and control devices 18 serving as controllers, corresponding to each other on the left and right of a vehicle.

Each rear side camera 12 is installed at the outside of a vehicle front side end of an up-down direction intermediate portion of a vehicle side door (a front side door, not illustrated in the drawings) and images the vehicle rear side. The rear side camera 12 is provided in a substantially rectangular box shaped casing 13, serving as a supporting body, with a lens disposed facing toward the vehicle rear side to image the rear side of the vehicle. A vehicle width direction inside end portion of the casing 13 is attached to the side door, and the casing 13 is supported by the side door (vehicle body side) so as to be capable of pivoting in the vehicle front-rear direction.

Each monitor 16 is provided at the vehicle inside in the vicinity of a lower end of a front pillar, and mainly displays captured images of the respective rear side camera 12. Namely, the vehicle rear side can be viewed by checking the monitors 16 instead of outside mirrors. Note that, the monitors 16 may be configured including speakers, for example, in order to emit sound or speech.

The control devices 18 are provided corresponding to each other on the left and right, and control display of captured images of the respective left and right rear side cameras 12.

Figure 2:
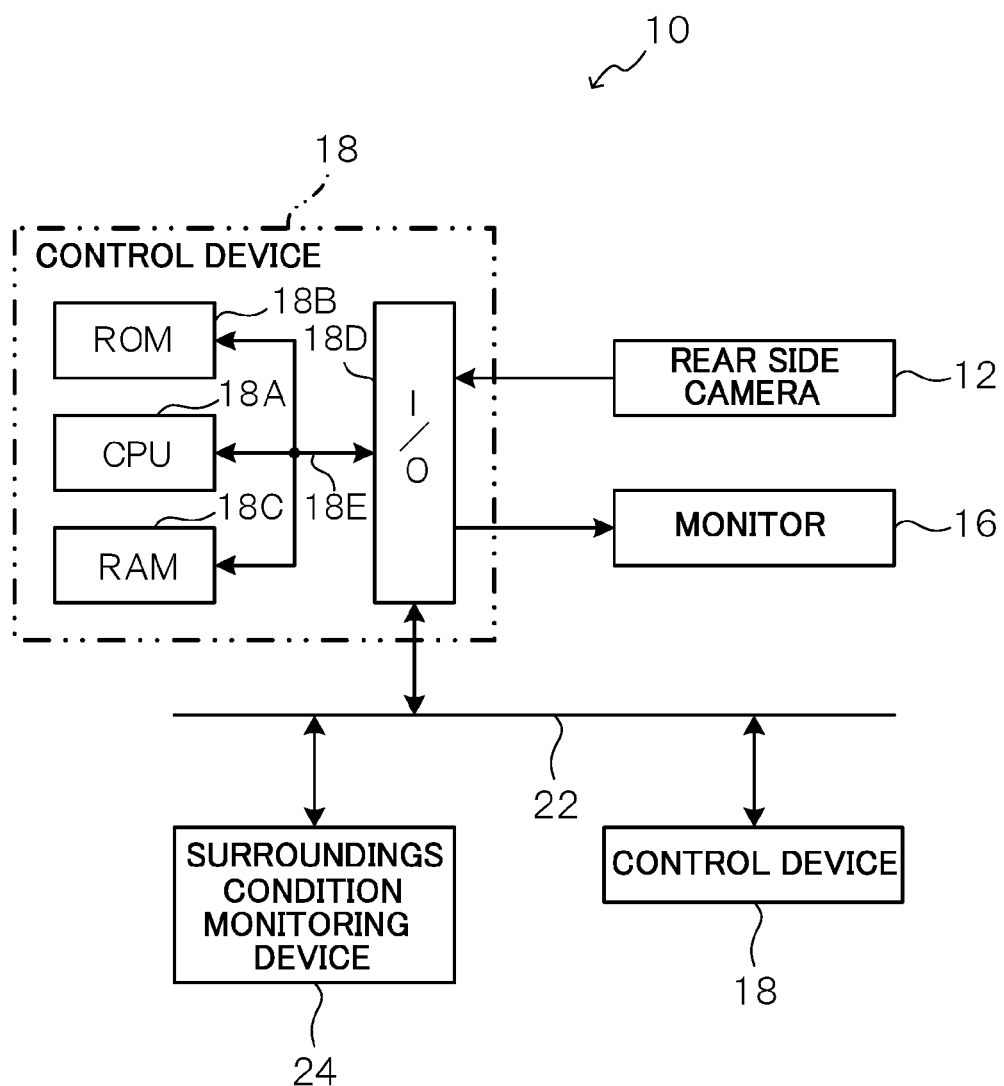
FIG. 2 is a block diagram illustrating a configuration of a control system of a vehicular viewing device according to the first exemplary embodiment.

Explanation follows regarding configuration of a control system of the vehicular viewing device 10 according to the present exemplary embodiment. FIG. 2 is a block diagram illustrating configuration of the control system of the vehicular viewing device 10 according to the first exemplary embodiment.

Each control device 18 is configured by a microcomputer in which a CPU 18A, ROM 18B, RAM 18C, and an input/output interface (I/O) 18D are connected together by a bus 18E.

Various programs, such as a program for displaying captured images of the rear side of the vehicle on the monitor 16, are stored in the ROM 18B. A program stored in the ROM 18B is expanded in the RAM 18C and executed by the CPU 18A to control display on the monitor 16.

An onboard network 22, such as a controller area network (CAN), to which the rear side cameras 12 and the monitors 16 are connected, is connected to the I/O 18D.

Each rear side camera 12 obtains captured images of the rear side by imaging the vehicle rear side. The captured images of the rear side obtained by imaging are output to the respective control device 18 as an imaging result of the rear side camera 12.

Each monitor 16 functions as a substitute for an outside mirror by displaying the captured images of the rear side imaged by the rear side camera 12. The monitor 16 is also capable of displaying a warning under control of the control device 18. An example of the warning display is a display warning of the presence of an obstacle when the corresponding obstacle, such as an approaching vehicle (or a vehicle that is approached by the vehicle itself), has been detected.

The other of the pair of control devices 18 that are provided corresponding to each other at the left and right of the vehicle is also connected to the onboard network 22 so as to be capable of intercommunication, and a surroundings condition monitor 24 is also connected to the onboard network 22.

The surroundings condition monitor 24 monitors the surroundings condition of the vehicle and outputs a monitoring result. In the present exemplary embodiment, the surroundings condition monitor 24 monitors warning targets, such as obstacles and vehicles approaching the vehicle. A milli-wave radar or the like may be applied as the surroundings condition monitor 24, which detects the distance between the vehicle itself and a warning target, and outputs a detection result. Note that the surroundings condition monitor 24 is not limited to a milli-wave radar, and various sensors may be applied.

Explanation follows regarding control of the warning display to the monitors 16 by the control devices 18 in the vehicular viewing device 10 according to the present exemplary embodiment.

In the present exemplary embodiment, each control device 18 acquires the monitoring result of the surroundings condition monitor 24, and determines from the monitoring result whether or not there is a warning target such as an approaching vehicle or an obstacle. When the control device 18 has detected a warning target from the monitoring result, the control device 18 controls the monitor 16 so as to display a predetermined warning image.

In cases in which milli-wave radar or the like has been applied as the surroundings condition monitor 24, the distance and direction of obstacles can be monitored, such that the control device 18 detects an obstacle that may be an approaching vehicle (such as a vehicle with an approach speed of a specific speed, or greater), as a warning target based on the monitoring result. The corresponding obstacle in the captured images is identified based on the direction in which the obstacle is present in the monitoring result of the surroundings condition monitor 24, and the captured images of the rear side camera 12. The warning is displayed in cases in which an obstacle, such as an approaching vehicle that is a warning target, has been detected from the captured images. In the present exemplary embodiment, for example, the occupant is urged to be careful by displaying or flashing a warning image (such as a rectangular shaped bar) at the upper side of the obstacle, such as a vehicle, that needs to be warned about. A display in a striking color such as orange or red is preferred as the warning image. Note that sound, speech, or the like may be incorporated in the warning when the warning image is displayed.

In cases in which one vehicle is present in the captured images, for example, this vehicle may be applied as the warning target when the vehicle itself is travelling at a high speed of a specific speed (such as 60 km/h), or greater, and the other vehicle is travelling in an adjacent lane and is approaching from the rear. In cases in which plural vehicles are present in the captured images, and when the vehicle itself is travelling at a high speed of a specific speed, or greater, the vehicle that is nearest out of the vehicles having part of the vehicle in an adjacent lane and approaching from the rear may be applied as the warning target. Alternatively, a vehicle or the like that satisfies other predetermined conditions may be applied as the warning target. In the present exemplary embodiment, the control device 18 determines such vehicles from the monitoring result of the surroundings condition monitor 24, and controls the monitor 16 to display the warning in cases in which a warning target vehicle has been detected from the captured images.

Note that in the present exemplary embodiment, an example has been explained in which the monitoring result of the surroundings condition monitor 24 is employed to detect a warning target such as an approaching vehicle; however, the detection method of the warning target is not limited thereto. For example, a warning target may be detected by extracting a vehicle from the imaging result of the rear side cameras 12 by pattern matching, and the approach speed found from changes in the size of the vehicle in the images, without employing the monitoring result of the surroundings condition monitor 24.

Figure 3:
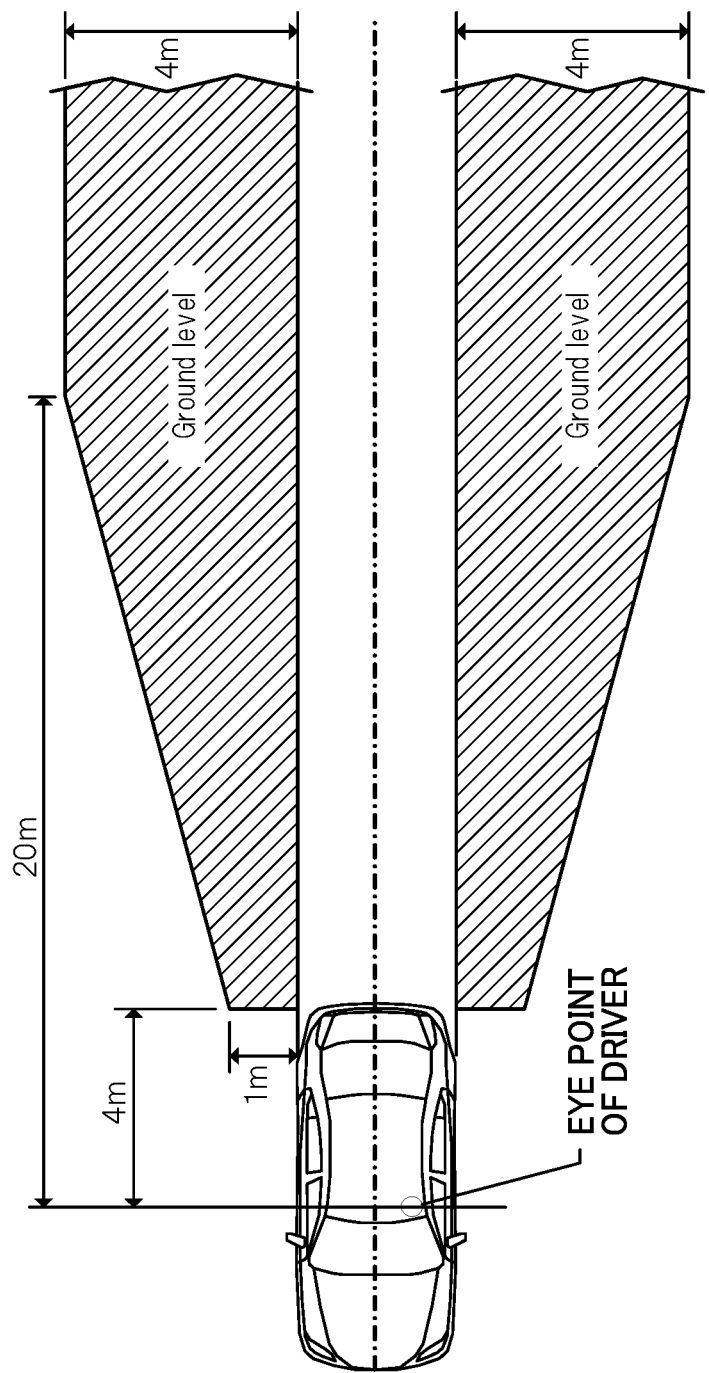
FIG. 3 is a diagram illustrating an example of a field of view required range according to European regulations.

Note that, in order to secure safety, there is a predetermined field of view required range with respect to the rear field of view of a vehicle and outside mirrors according to regulations and the like. As an example of a field of view required range, the field of view required range in European regulations is specified as the hatched regions illustrated in FIG. 3. Note that the field of view required range specified in European regulations illustrated in FIG. 3 is merely an example. The field of view required range is not limited thereto, and a range may be applied according to each country.

Figure 4A:
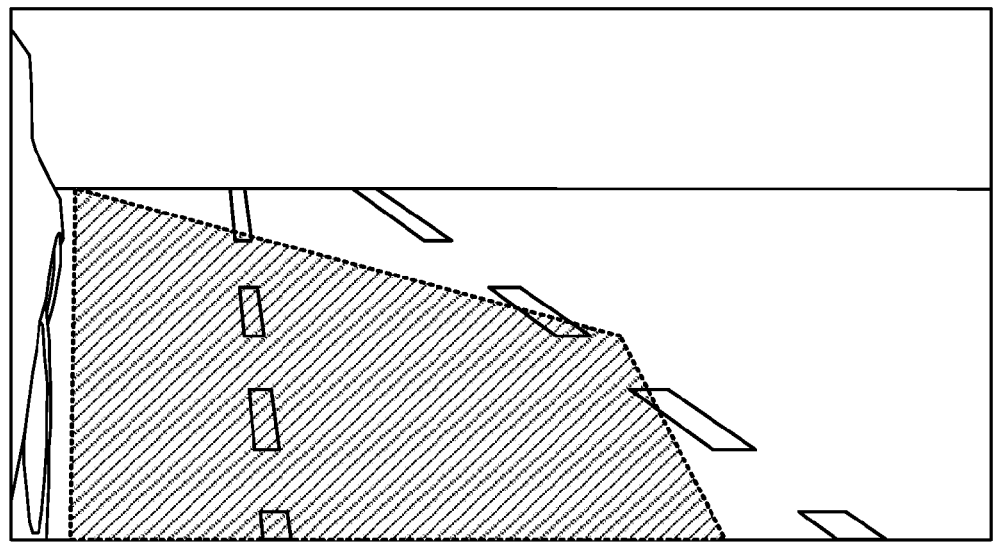
FIG. 4A is a diagram illustrating a region on a captured image corresponding to a field of view required range.

Since the field of view required range is determined by regulations and the like, a region in the captured images corresponding to the field of view required range (such as the hatched region illustrated inside dotted lines in FIG. 4) needs to be viewable by the occupant.

However, if the control device 18 was to superimpose a warning image in the field of view required range when displaying the warning image, there would be a possibility that the rear field of view would be impeded.

Figure 4B:
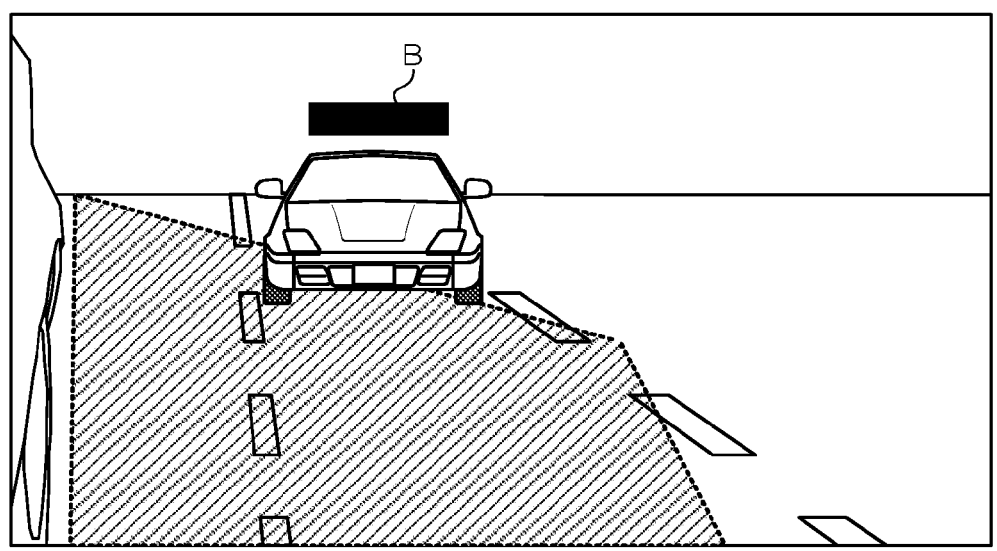
FIG. 4B is a diagram illustrating an example in which a rectangular shaped bar is displayed as a warning image outside a field of view required range.

In the present exemplary embodiment, the monitor 16 is controlled such that when the control device 18 displays a warning image, such display is outside the predetermined field of view required range. For example, as illustrated in FIG. 4B, a rectangular shaped bar B is displayed outside the predetermined field of view required range as the warning image in order to warn of an approaching vehicle that is a warning target.

Figure 5A:
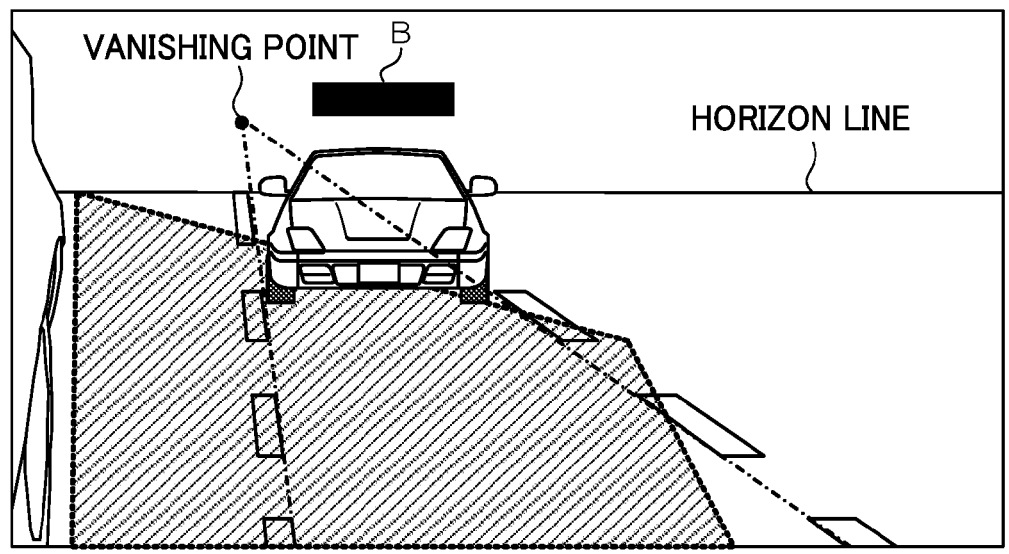
FIG. 5A is a drawing illustrating a vanishing point on a captured image.

As a region outside the field of view required range, a region outside the field of view required range may be identified by, for example, predetermining the region corresponding to the field of view required range in the captured images. Alternatively, a region envisaged to be outside the field of view required range may be found from out of the captured images. As a method of finding the region envisaged to be outside the field of view required range from the captured images, for example, a vanishing point or a horizon line in the captured images inevitably marks a region further toward the upper side than the field of view required range, and so this is found. The region further toward the upper side than the found vanishing point or horizon line may be simply determined to be a region outside the field of view required range. As illustrated in FIG. 5A, for example, the vanishing point may be obtained by detecting vehicle lanes from the captured images, and finding an intersection point of the vehicle lanes. The horizon line may be found from the attachment position of the rear side camera 12 and the tilt of the optical axis with respect to the horizontal, and so on, and the position of the horizon line may be found in the captured images from the attachment position of the rear side camera 12.

Figure 5B:
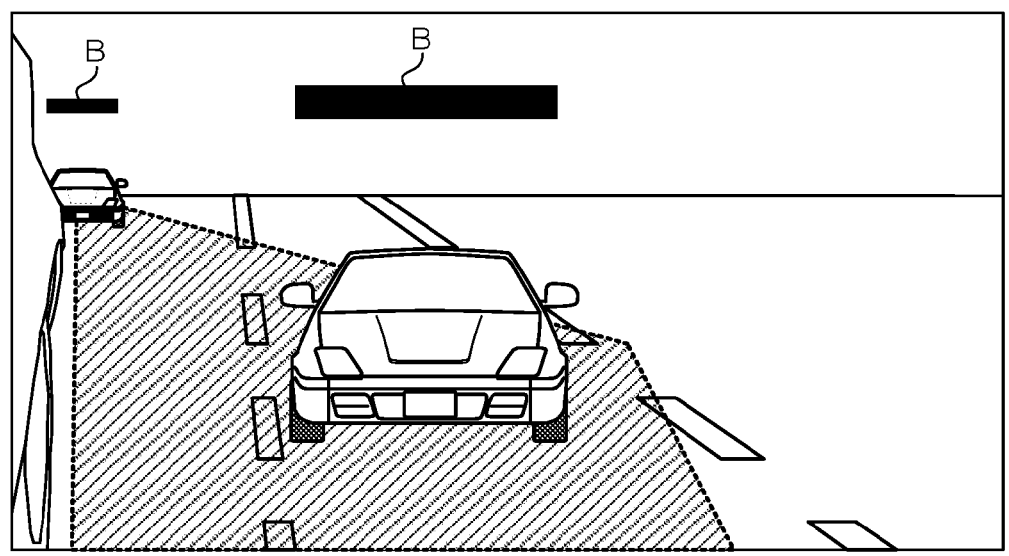
FIG. 5B is a drawing illustrating an example in which the size of the rectangular shaped bar has been changed according to the size of the warning target in the image.

Note that, when a warning image such as a rectangular shaped bar B is displayed, as illustrated in FIG. 5B, for example, the size of the rectangular shaped bar B (at least one of the left-right direction length or the up-down direction length) may be changed according to the size of the warning target in the image. Alternatively, the length and size of the rectangular shaped bar B may be changed according to at least one of the size of the warning target in the captured image, and the distance between the vehicle itself and the warning target.

Figure 6:
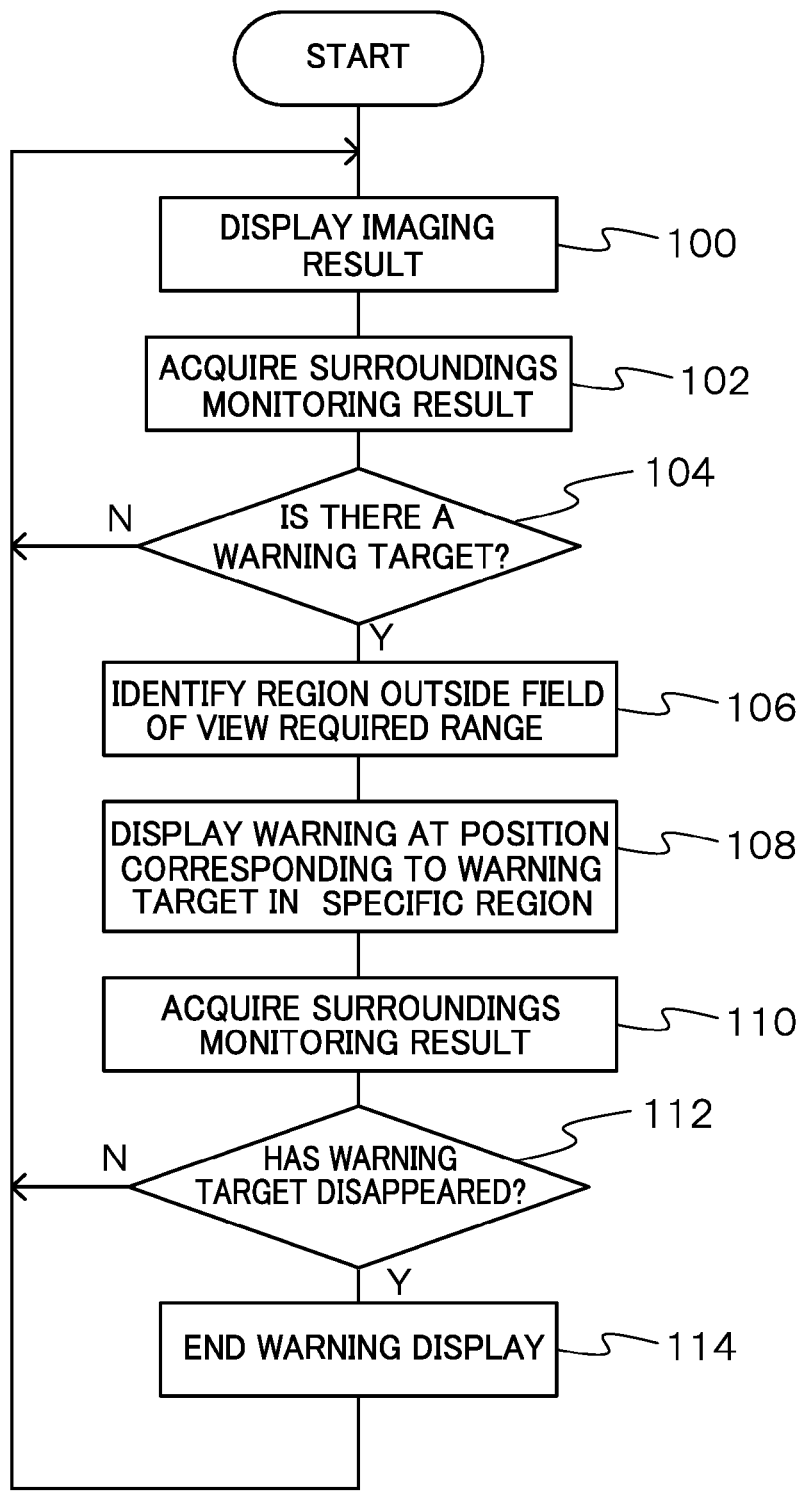
FIG. 6 is a flowchart illustrating an example of a flow of processing performed by a controller of a vehicular viewing device according to the first exemplary embodiment.

Explanation follows regarding specific processing performed by the control devices 18 of the vehicular viewing device 10 according to the present exemplary embodiment configured as described above. FIG. 6 is a flowchart illustrating an example of a flow of processing performed by the control devices 18 of the vehicular viewing device 10 according to the present exemplary embodiment. Note that, for example, the processing in FIG. 6 starts when an ignition switch, not illustrated in the drawings, has been switched on, and ends when the ignition switch has been switched off.

At step 100, each control device 18 acquires the imaging result of the respective rear side camera 12 and controls such that the imaging result is displayed on the monitor 16, and processing proceeds to step 102.

At step 102, the control device 18 acquires the monitoring result of the surroundings condition monitor 24, and processing proceeds to step 104.

At step 104, the control device 18 determines whether or not there is a warning target based on the monitoring result of the surroundings condition monitor 24. In this determination, for example, determination is made as to whether or not there is an obstacle that satisfies a predetermined condition (such as a vehicle approaching at a specific speed, or greater). In cases in which determination is affirmative, processing proceeds to step 106, and in cases in which determination is negative, processing returns to step 100, and the above-described processing is repeated. Note that the determination as to whether or not there is a warning target may be determination as to whether or not there is a vehicle travelling in an adjacent lane and approaching from the rear when the vehicle itself is travelling at a high speed of a specific speed (such as 60 km/h), or greater. Alternatively, this determination may be determination as to whether or not a vehicle is present having part of the vehicle in an adjacent lane and approaching from the rear, when the vehicle itself is travelling at a high speed of a specific speed, or greater.

At step 106, the control device 18 identifies a region outside the predetermined field of view required range, and proceeds to step 108. In the present exemplary embodiment, for example, the vanishing point, the horizon line, or the like is found in the captured images, and a region at the upper side of the vanishing point or the horizon line is identified as a region outside the field of view required range. Note that both the vanishing point and the horizon line may be found to identify a region outside the field of view required range.

At step 108, the control device 18 controls the monitor 16 such that the warning image is displayed at a position corresponding to the warning target in the region outside the field of view required range identified at step 106, and proceeds to step 110. For example, as illustrated in FIG. 5A, the control device 18 controls the monitor 16 such that a warning image such as the rectangular shaped bar B is displayed in a position corresponding to the warning target at the upper side of the vanishing point and of the horizon line. Namely, the region at the upper side of the vanishing point and the horizon line is always a region outside the predetermined field of view required range, such that the rectangular shaped bar B serving as the warning image is displayed outside the predetermined field of view required range illustrated by the hatching in FIG. 5A. This enables the occupant to be warned without the warning image impeding the field of view. Note that, in cases in which plural warning target vehicles are present, a warning may be displayed for the warning target that is the greatest danger (such as the closest vehicle), or a warning may be displayed for all the vehicles that satisfy a predetermined condition (such as an approaching speed of a specific speed, or greater) as warning targets.

At step 110, the control device 18 re-acquires the monitoring result of the surroundings condition monitor 24, and proceeds to step 112.

At step 112, the control device 18 determines whether or not the warning target has disappeared based on the monitoring result of the surroundings condition monitor 24. Namely, the control device 18 determines whether or not the warning target determined at step 104 has disappeared, and proceeds to step 114 in cases in which determination is affirmative, or returns to step 100 and repeats the above-described processing in cases in which determination is negative.

At step 114, the control device 18 controls the monitor 16 such that the warning display displayed at step 108 is ended, returns to step 100, and repeats the above-described processing.

Due to the control device 18 controlling in this manner, the warning image is displayed in a region outside the predetermined field of view required range, thereby enabling impediment to the field of view of the field of view required range by the warning image to be reliably prevented. Since the warning display does not impede the field of view, safety can be improved.

By finding the region at the upper side of the vanishing point or the horizon line in the captured image as a region outside the predetermined field of view required range, a region outside the field of view required range can be easily identified without needing to find the field of view required range according to the respective regulations in each country.

Second Exemplary Embodiment

Figure 7:
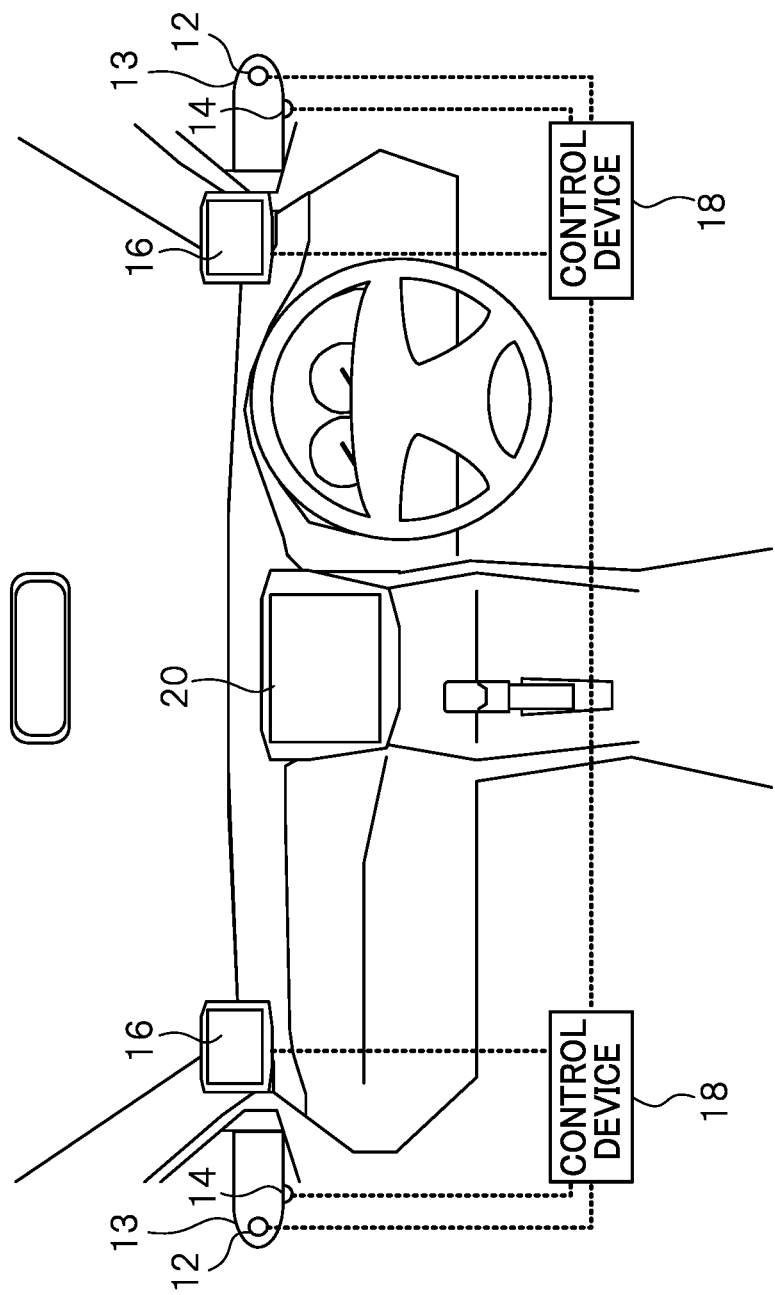
FIG. 7 is a diagram illustrating a schematic configuration of a vehicular viewing device according to a second exemplary embodiment.

Explanation follows regarding a vehicular viewing device according to a second exemplary embodiment. FIG. 7 is a drawing illustrating a schematic configuration of the vehicular viewing device according to the present exemplary embodiment. Note that similar configuration to the previous exemplary embodiment is appended with the same reference numerals, and detailed explanation thereof is omitted.

In the present exemplary embodiment, a configuration to automatically adjust luminance when displaying on the monitors 16 has been added to the previous exemplary embodiment.

Specifically, as illustrated in FIG. 7, in the vehicular viewing device according to the present exemplary embodiment, surroundings cameras 14 and a center monitor 20, serving as a surroundings imaging section, are further added to the previous exemplary embodiment. Note that in the present exemplary embodiment, an example is explained in which an imaging result of the surroundings cameras 14 is displayed on the center monitor 20; however, the imaging result may be displayed on the monitors 16. In such cases, the center monitor 20 may be omitted.

Each surroundings camera 14 is provided in the same casing 13 as the respective rear side camera 12, and images the vehicle surroundings. The surroundings camera 14 is provided with a fisheye lens and is disposed facing the vehicle lower side direction. Namely, the surroundings camera 14 images the front-rear direction and sideward direction of the vehicle, these being the vehicle surroundings, using the fisheye lens. The surroundings camera 14 images a region with a wider imaging range than that of the rear side captured images, and includes at least a specific region corresponding to the vehicle front side of an extension line between the occupant and the monitor 16.

The center monitor 20 generates and displays overhead images centered on the vehicle from the captured images of the surroundings cameras 14, and display may, for example, be performed on an operation panel of an onboard device (such as a navigation system, air conditioning unit, or audio device).

In the present exemplary embodiment, each control device 18 has a function in which the brightness of the specific region corresponding to the vehicle front side of the extension line between the occupant and the monitor 16 is extracted from the captured images of the surroundings camera 14, and the luminance of the monitor 16 is adjusted according to the extracted brightness of the specific region.

Figure 8:
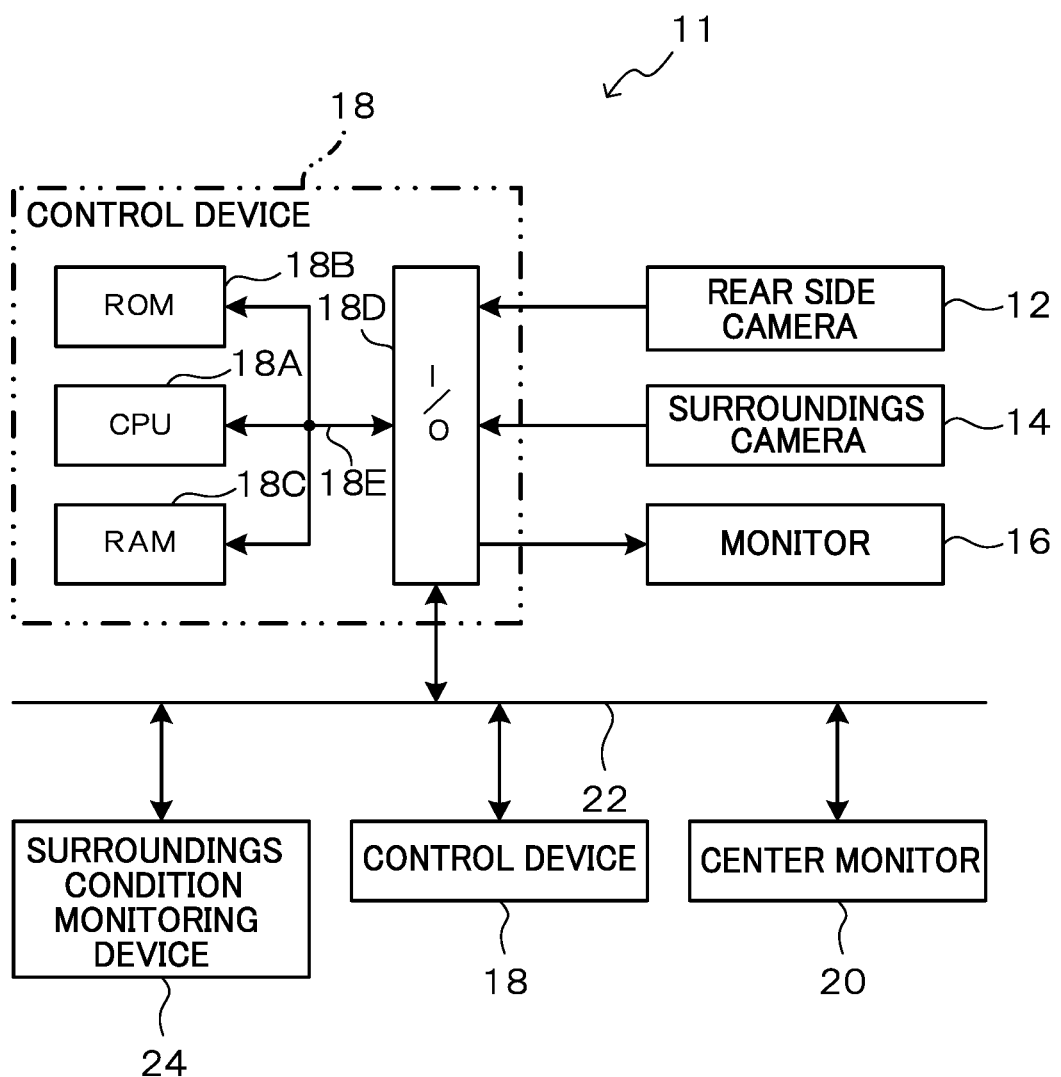
FIG. 8 is a block diagram illustrating a configuration of a control system of a vehicular viewing device according to the second exemplary embodiment.

Explanation follows regarding configuration of a control system of the vehicular viewing device according to the present exemplary embodiment. FIG. 8 is a block diagram illustrating configuration of the control system of the vehicular viewing device according to the present exemplary embodiment. Note that similar configuration to the previous exemplary embodiment is appended with the same reference numerals, and detailed explanation thereof is omitted.

As described above, a vehicular viewing device 11 according to the present exemplary embodiment is further provided with the surroundings cameras 14 and the center monitor 20 with respect to the previous exemplary embodiment.

Each surroundings camera 14 is connected to the I/O 18D of the respective control device 18, and obtains captured images of surroundings by imaging the front-rear direction and sideward direction of the vehicle, these being the vehicle surroundings. The captured images of surroundings obtained by imaging are output to the control device 18 as an imaging result of the surroundings camera 14. Note that the imaging result of the surroundings camera 14 is also output to the center monitor 20.

As described above, the center monitor 20 generates and displays overhead images from the captured images of surroundings of the surroundings cameras 14. As also described above, the center monitor 20 performs display on the operation panel of the onboard device (such as the air conditioning unit, navigation system, or audio device). Note that, although not illustrated in the drawings, the center monitor 20 is configured including a microcomputer in which a CPU, ROM, RAM, and an I/O interface are connected together by a bus, similarly to in the control devices 18.

In the vehicular viewing device 11 according to the present exemplary embodiment configured as described above, display of the warning image is performed as explained in the previous exemplary embodiment. However, since the above-described processing of FIG. 6 is executed to display the warning image, detailed explanation is omitted here.

Figure 9:
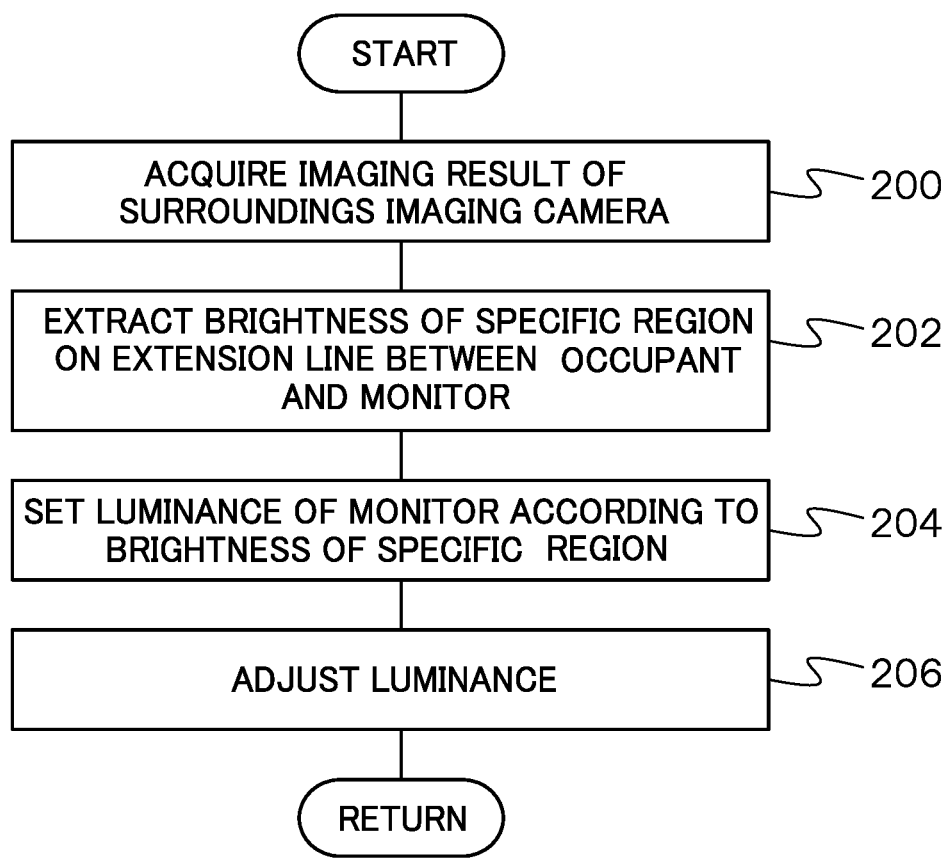
FIG. 9 is a flowchart illustrating an example of a flow of luminance adjustment processing performed by a controller of a vehicular viewing device according to the second exemplary embodiment.

In the present exemplary embodiment, as described above, each control device 18 adjusts the luminance when displaying captured images on the monitor 16. Explanation follows regarding the specific processing performed by the control device 18 when adjusting the luminance. FIG. 9 is a flowchart illustrating an example of a flow of luminance adjustment processing performed by the control devices 18 of the vehicular viewing device 11 according to the present exemplary embodiment. Note that the processing in FIG. 9 is performed, for example, in cases in which captured images at the above-described step 100 in FIG. 6 are displayed. Alternatively, the processing may be performed at every predetermined interval.

At step 200, each control device 18 acquires the imaging result of the respective surroundings camera 14 and proceeds to step 202.

At step 202, the control device 18 extracts the brightness of the specific region on the extension line between the occupant and the monitor 16 from the captured images of the surroundings camera 14, and proceeds to step 204. With respect to the specific region, for example, a predetermined range that allows for changes in eye-point position and seat position due to differences in occupant build may be applied as the region of the predetermined range at the vehicle front side.

At step 204, the control device 18 sets the luminance of the monitor 16 to a predetermined value corresponding to the brightness of the specific region extracted at step 202, and proceeds to step 206.

At step 206, the control device 18 controls the monitor 16 to become the set luminance and the series of processing is returned.

By adjusting the luminance of the monitor 16 in this manner, the luminance is adjusted according to the brightness in the line of vision ahead of the occupant when the occupant checks the monitor 16, thereby enabling display to be performed at a suitable luminance corresponding to the brightness surrounding the monitor.

Note that in the second exemplary embodiment, the luminance of the center monitor 20 may be adjusted in the same manner as when adjusting the luminance of the monitors 16. Namely, the brightness of a region in front of an extension line between the occupant and the center monitor 20 may be extracted, and the luminance of the center monitor 20 may be adjusted to a predetermined luminance according to the extracted brightness.

In the first exemplary embodiment, an example has been explained in which the imaging result of each rear side camera 12 is displayed by the respective monitor 16; however, configuration is not limited thereto. A configuration may be applied, for example, in which behind the vehicle rear is imaged by a rear camera, and the imaging result is displayed on a monitor. In such cases, the center monitor 20 of the second exemplary embodiment may be applied as the monitor that displays the captured images of behind the vehicle.

The processing performed by the control devices 18 in each of the above exemplary embodiments has been explained as software processing; however, configuration is not limited thereto. For example, the processing may be performed by hardware, or the processing may be performed by a combination of both hardware and software.

The processing performed by the control devices 18 in each of the above exemplary embodiments may be stored and distributed as a program in a storage medium.

The present invention is not limited to the above description, and obviously various modifications may be implemented within a range not departing from the spirit of the present invention.

What is claimed is:
1. A vehicular viewing device comprising:
a rear imaging section having a predetermined field of view behind a vehicle, the predetermined field of view including a required range of view;
a display section that displays a captured image from the rear imaging section; and
a controller that, when a warning target has been detected in the captured image, controls the display section such that a predetermined warning image is displayed in a region outside the required range of the predetermined field of view in the captured image,
wherein the controller controls the display section such that the warning image is displayed in a region above a horizon line or a vanishing point in the captured image as the region outside the field of view.
2. The vehicular viewing device of claim 1, wherein:
when the warning image is displayed in a region above the horizon line, the horizon line is found from an attachment position of the rear imaging section on the vehicle and an optical axis of the rear imaging section; and
when the warning image is displayed in a region above the vanishing point, the vanishing point is found from the captured image.
3. The vehicular viewing device of claim 1, wherein:
the controller further controls the display section such that the size of the warning image is changed and displayed according to at least one of a size of the warning target in the captured image, or a distance to the warning target.

4. The vehicular viewing device of claim 1, further comprising a rear imaging section that images behind the vehicle.

5. The vehicular viewing device of claim 1, further comprising
a surroundings imaging section that images vehicle surroundings including at least a specific region along a line between an occupant and the display section, and
wherein the controller extracts a brightness of the specific region from a captured image of the surroundings imaging section along the line between the occupant and the display section, and further controls the luminance of the display section according to the extracted brightness.

6. The vehicular viewing device of claim 5, wherein the surroundings imaging section that images vehicle surroundings includes at least a specific region on an extension line between an occupant and the display section.

7. The vehicular viewing device of claim 6, further comprising a center monitor that generates and displays overhead images centered on the vehicle from images imaged by the surroundings imaging section.

8. The vehicular viewing device of claim 1, wherein a predetermined warning image is displayed above the warning target.

* * * * *